United States Patent Office 3,386,087
Patented May 28, 1968

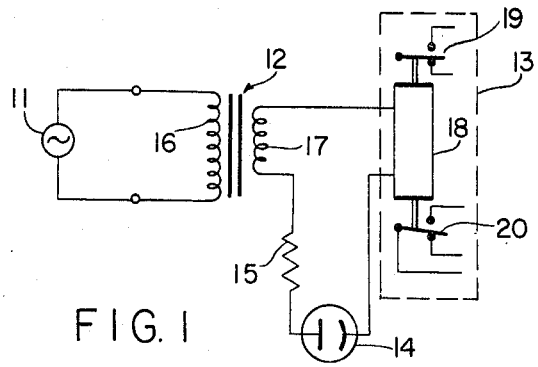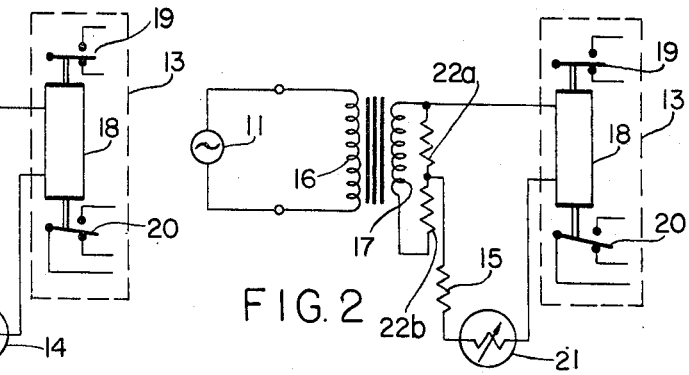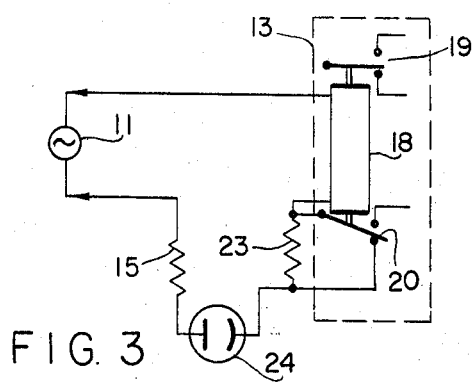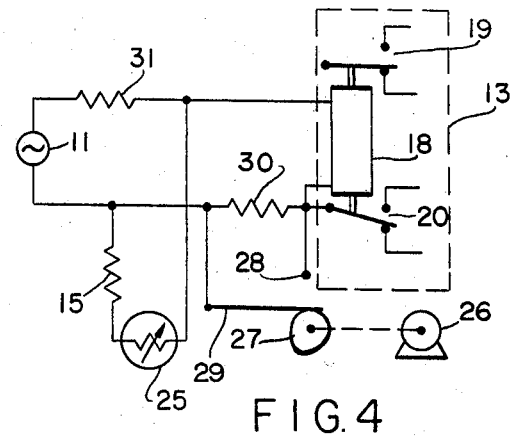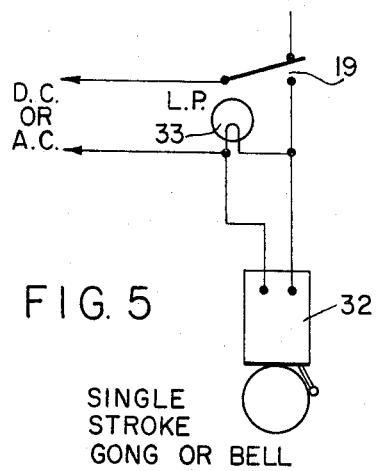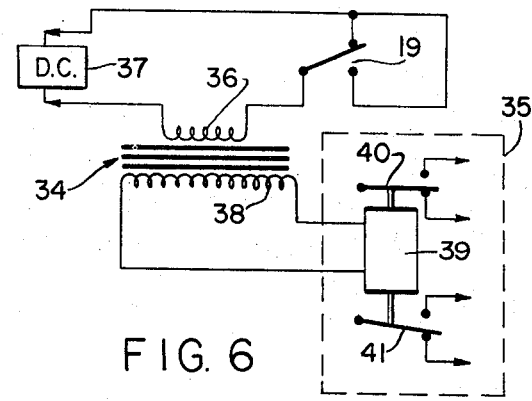

3,386,087
FAIL-SAFE CHECKING SYSTEM
William G. Rowell, Milton, Mass., assignor to Technical Marketing Associates, Inc., Concord, Mass., a corporation of Massachusetts
Filed Sept. 30, 1964, Ser. No. 400,420
4 Claims. (Cl. 340—253)

ABSTRACT OF THE DISCLOSURE

A fail-safe, self-checking condition monitoring system for continuously checking the integrity of the components in said system. One embodiment makes use of the inherent fluctuations of the alternating current power source to derive a repetitive checking signal, the loss of which indicates an emergency condition. Other embodiments use other means for obtaining the repetitive checking signal. Changes in the predetermined period of the checking signal may also be used to indicate an emergency in various embodiments.

---

The present invention relates to means for continuously checking the operability of an electrical system and more particularly pertains to a fail safe checking system which will provide a warning signal whenever a predetermined condition exists or when any component part of the system fails.

Numerous checking systems and devices have been employed to indicate certain conditions, such as water level, fire, etc. But none of these systems have been capable of always providing an indication of a failure of a component part of the system. For example, a closed loop fire alarm system which comprises a thermostat and a power source may be checked continuously for continuity and if the thermostat closes to complete the circuit for any reason such as fire or failure, an alarm will sound. However, in such a system several unsafe failures can occur, such as an open circuit anywhere or by failure of the thermostat in an open position. In either event, the alarm would not sound even when the condition to be detected occurred.

For purposes of definition, as herein used, we may define a safe failure as the type of failure whereby the condition detecting apparatus provides a false signal, thereby indicating that the condition sensor has sensed the even to be detected, when actually a component in the system has failed in such a manner as to produce this false indication. While this type of failure may well be classified as a nuisance failure, it nevertheless is a safe failure. An unsafe failure, as the term is used herein, is created when a component fails in the condition detecting apparatus in such a manner that no signal or indication whatsoever is produced upon such a component failure. Thus, the monitoring system can be completely inoperative through such failures of components and the assurance, or indication produced, will be one which falsely indicates that the system is operable when, in fact, it is completely incapable of detecting the event or condition to be detected.

A number of other prior art systems are described. For example, in U.S. Patents Nos. 2,807,008, 2,798,213, and 2,798,214, all by the present inventor. These patents disclose that the characteristic fluctuation of the event to be detected by the sensor may be utilized for self-checking purposes if the corresponding fluctuation is converted to pass through the amplifier unintegrated or teach that when the principal signals are applied to the sensor a reaction in the system output occurs to feed back to the input of the modification preferably in the form of a controlled signal to thereby chop off the signal from the sensor. Or, further, teach that whenever the sensor element itself can fail in an unsafe position, self-checking may be accomplished by periodically chopping off the principal signal before it reaches the sensor, such as with a shutter arrangement. Thus, we have in general, prior art self-checking techniques that either transmit fluctuations characteristic of the principal signal through this system or in other cases, alternately energizing and de-energizing this system as by opening and closing a switch or by periodically externally applying to the sensor a simulation of the signal or event to be detected.

Other prior art devices such as disclosed in U.S. Patent No. 3,094,690 by R. L. Voorhees provide a so-called tamper-proof burglar alarm system utilizing schemes such as randomly varying and reversing the voltage and further employing a consistent constantly varying resistance characteristic to thereby allegedly prevent burglar alarm defeating. Such prior art systems as described above have indeed achieved a far greater improvement in providing self-checking of the system, but unfortunately, provide such an improvement at the sacrifice of reliability due to the initial number of components required to obtain the results. Further, the added cost due to these additional components can be of significance in a highly competitive market and the increased complexity of the circuit can present additional problems.

In common with the above-mentioned self-checking references, the subject invention is also of a dynamic nature or one of action whereby the action or lack of action can readily be monitored by one or more of the many ways well-known to one skilled in the art. The present invention further has the advantages of simplicity and the ability of not only detecting the desired condition but also be capable of detecting any failure of any component part of the system.

The present invention is particularly concerned with the problem of providing an indicating signal, which may obviously be used for control purposes, whenever a predetermined event to be detected occurs, or whenever, because of any reason whatsoever, the system falsely becomes inoperative. Inasmuch as a monitoring system can become inoperative through component failure, environmental conditions or manual circumvention, it is a prime concern of this invention that an indication of such a failure be given.

It is an object of the present invention to provide a novel method and apparatus for producing an improved monitoring arrangement wherein the components in the condition detecting apparatus or system are cylically checked.

It is a further object of the present invention to provide a novel, relatively simple, fail-safe, self-checking, indicating, monitoring, controlling, recording or other supervisory system that advances the current art and teachings through use of the subject invention.

Accordingly, it is a still further object of the present invention to accomplish the results obtained in a unique, practical, more reliable and less costly manner than heretofore. This is primarily due to the fact that fewer, less costly, less complex and less failure prone elements are utilized in a very simple, practical and straightforward manner to accomplish these objects of the invention. Consequently, maximum reliability and economy is achieved with a minimum of maintenance required.

In addition, it is a prime requirement of the invention to detect and indicate an unsafe failure condition caused by environment conditions or caused by component failures. It is a well recognized fact that electronic, electrical or other components in a given monitoring or supervisory system have almost a predictable life expectancy. Therefore, it is not the fact that components are predestined to failure that is of primary concern to the subject invention, but rather how their eventual failure will cause the system to react—safe or unsafe.

Still another object is to provide the maximum degree of safety possible, commensurate with simplicity and reliability, by providing an indication, warning signal or control action, when loss of integrity occurs for any reason within defined limits of the system. For example, the condition sensor or transducer is often quite remote from the rest of the monitoring system and in the cabling or wiring therebetween a short circuit or open circuit can readily occur. Also, the sensor itself, because of internal defects or ambient conditions, could well become shorted or open circuited. Likewise, in the associated control or monitoring system, defects could occur through component failures or undesirable ambient conditions.

It is a very important object of the invention to produce the above results with a minimum of components or elements and thus inherently increase the overall system reliability and thereby reduce the nuisance shut-downs of the system, caused by safe-failures. For example, some prior art devices may utilize, and require, use of various forms of shutters or masks to periodically obscure electromagnetic radiation or optical signals from reaching the sensor. Other prior art devices may utilize various forms of switching or modulating devices to influence either the sensor output signal or the input signal to the amplifier or the controlling device. These prior art forms referred to may well provide the necessary checking signal but inasmuch as many additional components are required in some cases, they are obviously subject to wear and tear and electrical failures, thus producing unnecessary shut-downs of the system—even though it is a fail-safe shut-down. Such unnecessary shut-downs can obviously in many cases be uneconomic and extremely undesirable.

The objects of the subject invention are accomplished through use of a novel circuit-checking technique which teaches that an energizing voltage in the monitoring system must have, or be provided with, successive values of magnitude. For example, if an AC voltage source is utilized, at least two levels of voltage inherently exist and are accordingly utilized by the subject invention to provide the necessary checking signal. In DC systems the only modification required to provide the checking signal for the subject invention is one of modulation, or otherwise providing means whereby the DC voltage is periodically varied from one DC value, or level, to another. The swing between the two levels of energizing voltage accordingly provides the checking signal of the invention. Thus not only are the system energizing requirements furnished by the supply voltage, but the supply voltage itself can also be utilized to provide the checking signal for monitoring the system integrity. Many methods are currently well known in the art whereby such voltage variations from one state of energization to another state of energization may be readily produced. The subject invention is primarily concerned with the utilization of such voltage swings or variations to produce a circuit-checking signal which, through may well known methods, can be itself monitored for either its presence, absence, or deviation from a predetermined normal.

These, and other important objects, accomplishments and advances provided by the present invention, will be apparent to those skilled in the art, upon reference to the following specifications, claims and drawing of which:

FIG. 1 is a schematic representation of the present invention adapted to produce a distinctive signal upon the presence of a predetermined condition or upon a failure of any component of the system.

FIGS. 2, 3 and 4 are other embodiments of the present invention.

FIGS. 5 and 6 disclose examples of indicating and controlling means that may be utilized with the above embodiments of the present invention.

Referring now to FIG. 1, there is described one embodiment of the present invention which utilizes a power source 11 coupled through a conversion device 12 to a monitor 13 in series with a resistance 15 and a remotely located detecting device or sensor 14.

More specifically, source 11 is an AC source, conversion device 12 is a transformer of the step-down variety with its primary winding 16 connected to power source 11 and its secondary winding 17 series connected through a current limiting resistor 15 to sensor 14, and monitor 13. In the embodiment shown, sensor 14 is a photoelectric cell remotely located from the rest of the circuit by appropriate cabling and monitor 13 is a relay having a coil 18. Coil 18 is designed as to be capable of activating a pair of make-break double-pole, double-throw switches 19 and 20.

A specific model of the present invention shown in FIG. 1 has been constructed utilizing the following specific components. This list of specific components as used in the model is not, however, to be construed as a limitation of the present invention but merely exemplary of the type of components that may be used. Transformer 12—Thordason #26F68 117 volts AC primary 24 volts secondary. Relay 13—Advance GHA—26–24 volts AC, 70 ohms coil, double-pole double-throw. Resistor 15–100 ohm, 1 watt. Sensor 14—Delco Radio cadmium sulphide photocell #LDR–25.

If desired, the sensitivity of this system shown in FIG. 1 may be altered by selection of the impedance value of resistor 15 and the sensitivity of relay 13. In the particular embodiment, although a transformer is shown as the conversion device, other devices such as rectifiers, frequency converters, dropping resistors and the like may also be used.

The operation of the device described in FIG. 1 with the above-listed components is as follows: an illumination source (not shown) such as a 60 watt bulb is placed approximately 18″ away from sensor 14. When the illumination source is energized, radiant energy falling on sensor 14 permits a current to flow through the circuit comprising secondary winding 17, resistor 15, and coil 18 causing the relay 13 to pulsate or oscillate thereby producing a loud, audible buzz. If the photocell is totally obscured from the light by, for example, a shutter (not shown) or if the light fails or if any component part or connection thereto opens, the current through the relay and the voltage across it, drops to zero, de-energizing the relay causing the audible signal to cease, thus indicating that a predetermined condition has been sensed or detected. If desired, one of the switches 19 or 20 can be utilized to indicate this development by providing a suitable alarm circuit, later to be described in conjunction with FIGS. 5 and 6, across the selected switch which closes only upon deenergization of relay 13.

If, however, any of the components become shorted, the current in the loop rises and the voltage across the relay 13 increases causing the relay to hold in a fixed position which also stops the audible signal and actuates one of the switches 19 or 20 sounding an alarm and thus indicating this type of component failure. If desired, a single alarm system may be used. In such an event the system would be designed to respond to either type of failure.

In order to produce the audible signal indicating that the circuit is functioning within the desired limits, it is necessary to have a relay 13 which is responsive to the fluctuating or AC voltage applied by source 11. The relay, as pointed out previously, is an alternating current type readily commercially available which essentially tries to release every time the voltage applied to the coil 18 goes to ZERO. This effect is essentially eliminated in relays designed for AC by use of a special construction of the relay core which usually consists of splitting the core where it faces the armature and encircling at least one of the prongs with a copper ring, having the appearance of the letter *d*. This ring is sometimes referred to as a "shading coil." In some relays two such rings may be placed back to back or one on top of the other. This ring introduces the phase shift in a portion of the magnetic flux flowing through the magnetic coil of the relay so that it decreases the pull on the armature tending to cause the armature to drop out.

It might also be mentioned here that although some direct current relays will respond to alternating current, the armature has a strong tendency to chatter or buzz at twice the frequency of the applied voltage since, in effect, the relay starts to release each time the current passes through zero. However, copper slugs, rings, sleeves, or washers may well be found on DC relays, as well as AC relays, to cause a slow action on the relay. A time delay thereby could be effective upon either the pull in or drop out of the armature depending upon which end of the relay core the copper sleeve is located. When the sleeve is close to the winding, induced current in the sleeve will generate magnetic flux to oppose the operating flux. Conversely, when the circuit to the winding or coil is opened, induced currents will generate flux in the core in a direction which tends to hold the relay. When the operating DC steady state of the relay is reached the copper sleeve has no effect upon the relay.

It is an important part of this disclosure that the AC relay described in FIG. 1 be permitted to effectively pulsate within a predetermined voltage range. The specific relay disclosed in FIG. 1 was suitable as is and did not require any modification to reduce this shading coil effect. Other types of AC relays more heavily shaded may well require some modification of the coil to reduce the shading effect in order to permit the armature to follow the AC pulsations through a greater voltage range. This modification may be readily accomplished by reducing the physical size of the D-ring by filing, grinding, or drilling. Where the relay has two copper rings removal of one and reduction in the size of the other is usually quite effective.

It can be seen from the above examples that relay 13 may be adjusted and the impedance of the system chosen such that upon a predetermined condition the relay will be either drop in, hold or pulsate.

The relay 13, in this example, held in and activated one of the suitable switches 19 or 20 when 16 volts was applied to the coil 18. A loud or audible buzz caused by the pulsating relay was obtained when the voltage on coil 18 was in the range of 10–14 volts and the relay dropped out and became inactive when the voltage on coil 18 fell below 7 volts.

More specifically, in the circuit as shown in FIG. 1 using the components listed, when the light was held approximately 18" from the sensor a current of 66 milliamps flowed through the coil 18 and a voltage of 12 volts was applied thereto. This, as indicated would provide a loud distinctive buzz. However, when the phoocell became obscured from the light or when the light failed or any component part of the circuit opened, the current through the coil 18 and the voltage across it, dropped to zero thus causing the circuit to become inactive. When any of the components such as photocell 14 became shorted, the current through coil 18 rose to about 92 milliamps and the voltage across it increased to a maximum of 20 volts, causing the relay to be held in a fixed position.

From the above disclosure, it can now be seen that the present invention features a novel, simple, fail-safe checking-type of monitoring system. It is important to note that its simplicity and versatility greatly exceeds that of any of the prior art references. The circuit of FIG. 1 is further not limited to only off-on type of switching as is described above, but the circuit may also be used to indicate the level of radiation impinging upon the sensor 14.

Such a detector system may be described as follows. If we assume, for example, that the sensor 14 is activated by radiation from the illumination source, then when the radiation falls below a predetermined minimum, the coil 18 will not be energized. Conversely, if the intensity stimulating the photocell 14 is within a predetermined range, the load relay 13 will be pulsating and buzzing and if the intensity exceeds the predetermined level, the coil will be energized to such extent that relay 13 is held on. In each of the above events, appropriate circuits connected to switches 19 and 20 may be utilized to indicate this condition.

The device of FIG. 1 may also be used to indicate the physical distances separating the photocell 14 from the radiation source by suitably correlating the intensity of the radiation derived by photocell 14 by use of a suitable indicator.

It is, of course, recognized that should it be desirable to change the type of available current, converters or inverters may be utilized. Therefore, the present invention is not to be limited to any particular type of frequency or voltage characteristic of supply voltage. If, for example, direct current is chosen to power the monitoring system instead of alternating current, the necessary modulation of the power source, to produce at least two voltage levels, can be readily accomplished by use of any one of several methods known to those skilled in the art.

For example, a resistor can be connected in series with power source 11 and be periodically shorted out by mechanical or other electrical means. This would provide the necessary cyclic raising and lowering of the voltage and thus create the necessary checking signal of the present invention. The load relay would be so adjusted to the normal impedance of the system that it would normally pull in when the voltage was raised and drop out when the voltage was lowered.

Any suitable means of periodically varying impedance of the system could also be utilized to produce the checking signal. Further, the selected superimposed checking signal could obviously be of a frequency different than that of the fundamental line frequency.

FIG. 2 illustrates another embodiment of the invention which utilizes a temperature sensitive sensor 21 in place of photoelectric sensor 14 and a voltage divider network 22 across secondary winding 17 of transformer 12. The various components used in this embodiment may be of different values than those described in FIG. 1 and may be readily designed by anyone skilled in the art. Further, a variable resistor may be used in lieu of the divider network 22.

Temperature sensor 21 is preferably a type of thermistor which exhibits a negative temperature coefficient upon passage of a current therethrough. That is, its internal ohmic resistance will decrease due to a self-heating effect until it reaches a predetermined value governed mainly by the current limiting resistor 15.

If we now assume that the device shown in FIG. 2 is utilized as a liquid level detector, then as soon as the circuit is activated current flows through thermistor 21 causing its impedance to fall. When the impedance of thermistor 21 reaches a predetermined level, relay 13 will pulsate emitting an audible buzz. A short time delay is, of course, realized in this system due to the time required for the self-heating effect of the thermistor to reduce its impedance and permit the system current to rise to the level where the relay 13 starts to pulsate. When the liquid rises to contact the thermistor 21, the thermistor will be rapidly cooled causing the impedance of the thermistor 21 to increase rapidly. This increase in impedance in the thermistor 21 causes the voltage across coil 18 to drop, thus de-energizing the relay 13. By providing appropriate circuits on either switch 19 or 20, this condition can be readily determined.

If any component of the system described in FIG. 2, with the sole exception of the divider network system 22*a*, fails by becoming an open circuit, the relay 13 becomes de-energized, drops out and an appropriate alarm system activated. If the arm of the divider network designated 22a opens, or if the sensor, the current limiting resistor or that portion of the divider network designated 22b becomes shorted, the relay voltage rises causing the relay 13 to hold it again setting off an appropriate alarm. If portion 22a of divider network 22 becomes shorted, the relay voltage drops to zero causing the relay to drop out. It can now be seen that the detection circuit disclosed in FIG. 2 is versatile, fail-safe and self-checking. The device may further be used to detect any predetermined temperature range and appropriate indications, signals, or control actions can be initiated by proper use of circuits connected across switches 19 and 20 as previously described.

A device exhibiting the characteristics disclosed above in conjunction with FIG. 2 was built using the following list of commercially available components.

Transformer 16 and 17—Thordarson 26F68 117 v. AC Pri.-sec. 24 v.
Sensor 21—Fenwal Electronics Glass Bead Thermistor No. BG 35J3—P6 5K ohms, plus or minus 20% at 25 degrees C.
Resistor 15—Current limiting resistor of 59 ohms 25 w. (Workman Electronic Products filament dropping resistor).
Load Relay 13—Magnecraft Electric Co. No. W88AX–7 24 v. AC D.P.D.T. Coil resistance 33 ohms. Note: The physical size of the shading ring was reduced and the relay was arranged so that at 7 volts the armature was quiet. At 8 volts the armature pulsated and at 13½ volts the armature pulled in.
Resistor 22a—24 ohms.
Resistor 22b—6 ohms.

From the above described examples of the circuits shown in FIGS. 1 and 2, it should be noted that FIG. 1 requires a load relay to remain static or passive until the normal event can be detected, and upon the occurrence of the event, the load relay becomes dynamic and starts pulsing. In FIG. 2, the reverse is true. That is, the load relay is normally dynamic and pulsing until the event to be detected occurs, at which time the load relay either de-energizes or is held in. To reverse the actions of FIGS. 1 and 2, the circuits may be suitably arranged so that the sensor shunts the load relay 13 instead of being in series with it, as will be later disclosed in conjunction with FIG. 4. It should also be noted that both circuits are absolutely failsafe since any type failure, open or short, is immediately detectable.

FIG. 3 discloses still another embodiment of the present invention wherein the supply voltage variations producing the checking signal of the present invention are obtained by periodically changing the system impedance from one predetermined level to another. In this embodiment the type of load relay 13 utilized will obviously depend upon whether the available supply source voltage 11 is AC or DC. When the sensor 24 is a photoelectric cell and activated by a predetermined quantity of radiation, the system impedance will be lowered, resulting in additional current flow through the relay 13 causing it to pull in. When the relay 13 pulls in switch 20 associated therewith opens connecting shunt resistor 23 in the circuit. This resistor 23 raises the system impedance to the point where the load relay drops out and the cycle is repeated. This cycling continues until either a circuit fault or a loss of radiation falling upon the sensor 24 occurs.

Short circuits anywhere in the system cause the system impedance to fall and remain below the predetermined level which in turn causes the load relay 13 to hold in and activate an alarm.

To avoid possible contact buzzing when the contact switch 20 makes and breaks, it is desirable to utilize a slow acting relay arrangement. To avoid being dependent upon the operation of the load relay 13 to determine the checking frequency, other arrangements can be utilized. For example, the supply voltage can be independently modulated by switches not under the control of the load relay 13. These switches can be mechanically actuated at predetermined intervals to thereby periodically short out and cut in resistor 23, in which case the resistor 23 would be connected across the timing contacts instead of the switch 20. Many other possible schemes may also be used to modulate the supply voltage and thus create the necessary checking signal of the present invention.

Referring now to FIG. 4 there is disclosed a method of reversing the action of the load relay 13 when the predetermined event to be detected occurs. It will be seen that the sensor 25, in the instance shown as a thermistor, is connected through a shunt circuit to the relay 13. When in stand-by condition, the self-heating of the thermistor caused by the current flowing therethrough lowers the resistance of the thermistor to the point where the load relay is shunted down and no pulsing occurs.

It will be recalled that in FIG. 2 during standby, the load relay was pulsing and did not cease until the thermistor probe was cooled. In the present instance, however, the relay 13 is so arranged that the pulsing does not start until the thermistor probe is cooled. In addition to disclosing the method of reversing the action of the system upon sensing the event to be detected, FIG. 4 further teaches the use of independent means to obtain the checking signal. This independent checking means comprises a timing mechanism 26 which is mechanically connected to and rotates cam 27 which, in turn, causes switch 29 to engage and disengage contact 28 periodically at a predetermined rate, alternately putting resistor 30 into the circuit. Thus, when the system is functioning normally the checking signal is generated by the rise and fall of the voltage applied to coil 18 caused by the periodically removed short across resistor 30 by the switch 29 in conjunction with contact 28. The relay 13 will respond synchronously to the checking signal. It can also be seen that open circuits and short circuits in any component part cause changes from the normal system impedance resulting in a change in the pulse characteristic fed to coil 18 of relay 13. This change can be utilized to initiate an appropriate signal or control action through either switch 19 or 20 associated with relay 13.

Variations in this circuit arrangement can be made, for example, other voltage dropping resistors such as resistor 15 and resistor 31 may also be shorted by the timing contacts 28 and 29, thus providing voltage modulation to produce the checking signals. Whether or not it is desirable to have the load relay pulsing in either a stand-by or running condition is of little consequence here. It is important, however, that the present invention teach the wide range of possibilities and applications that may be utilized where desired. Likewise, it is of little importance as to what particular method may be ultimately selected to produce the necessary checking signal from the supply voltage. The technique of the present invention is so simple that it is felt that no extensive explanations or further illustrations will be required for one skilled in the art to completely understand the significance of the present invention and to practice its teachings.

It is of particular importance at this time to point out that at no time during the periodic checking periods of any of the above described circuits is either the sensor and/or the monitoring system rendered ineffective to respond to the predetermined event to be detected. For example, prior art self-checking systems, such as in the Rowell patents referred to above, inherently render their monitoring systems ineffective during at least some portion of the checking period. This can well be a disadvantage in some prior art self-checking monitoring systems, especially in cases where a relatively slow checking rate is utilized. Such a disadvantage is neither inherent or found in the present invention.

It should be noted at this time that even though certain components have, in each figure, been designated by the same numeral, they can have different values or characteristics from those described in conjunction with FIG. 1 without departing from the scope of the invention.

Referring now to FIG. 5, there is shown a prior art circuit which may be utilized as an alarm signal whenever a predetermined condition is detected in FIGS. 1 through 4. If this circuit is connected across either switch 19 or 20 associated with relay 13 and connected to an independent AC or DC source, then activation of switch 19 or 20 will cause the load, such as the single stroke gong or bell 32, to be activated. If desired, a visual signal, such as a light 33 may also be connected into the circuit as shown to provide a visual signal of the failure. It is obvious that the periodic operation of the visible signal provided by light 33 or the audible signal provided by bell 32 will supply the fail-safe signals indicative of the operation of the previously disclosed monitoring system by producing a steady indication of the alarms mentioned.

FIG. 6 discloses an additional method for initiating a suitable, visible, audible or control action when the switches 19 or 20 in FIGS. 1 thru 4 are activated by relay coil 18. The switches 19 or 20 are coupled through a transformer 34 to a slow release relay 35. More specifically, transformer 34 is preferably a step-up transformer and its primary winding 36 is coupled to switch 19 or 20 and to a D.C. power source 37. The secondary winding 38 is in turn coupled to the coil 39 of relay 35. Associated with relay 35 and the coil 39 are additional switching mechanisms 40 and 41 which may, for example, be connected to other indicating devices or control devices.

For purposes of disclosure, we will assume that the ratio of transformer 34 is one to three. This means that with a primary voltage of thirty volts, the secondary voltage on winding 38 will be 90 volts. The slow release relay 35 is arranged so that at least 90 volts will be required for its operation, and delays its release as long as the energizing pulses are of a predetermined minimum frequency. This is necessary so that if a switch 19 or 20 remains stationary beyond a predetermined time or becomes shorted or dirty, the slow release relay will drop out. The relay will also release whenever the primary coil 36 becomes shorted to the secondary coil 38, since the secondary voltage will then drop to less than the required 90 volts. This is due to the fact that even if the relay 35 was connected directly to the power source 37, the available voltage would be only thirty volts.

Additional schemes are available to those skilled in the art, other than those depicted in FIGS. 5 and 6 to produce an alarm signal whenever one of the switches 19 or 20 is activated. For example, polarized or differential type relays may well be utilized in this respect to provide maximum fail-safe security.

Since many of the elements in modes of operation in the disclosed embodiments can be readily interchanged with one another by one skilled in the art, it is not intended to limit the present invention to the specific embodiments disclosed in the above specification, except insofar as may be required by the scope of the appended claims.

What is claimed is:

1. A fail-safe, self-checking detection circuit comprising, an alternating current voltage source, a transformer, a bi-directionally conductive condition detecting sensor, a monitoring switching relay, said source being coupled through said transformer to a series circuit comprising said sensor and said relay, first and second switches associated with said relay, a first alarm system controlled by said first switch, a second alarm system controlled by said second switch, said relay being provided with a first voltage when said sensor is activated, said relay being provided with a second voltage when any component of said circuit becomes shorted, and said relay being provided with a third voltage when any component of said circuit becomes open, said relay pulsating and emitting an audible signal when said first voltage is detected, said relay activating said first switch and sounding said first alarm when said second voltage is detected and, said relay activating said second switch and sounding said second alarm when said third voltage is detected.

2. A fail-safe self-checking condition detecting circuit, comprising:
   a voltage source;
   a series circuit comprising:
      a voltage sensitive device;
      a bi-directionally conductive condition sensor having variable internal impedance; and
      a resistor in parallel with a shunting switch;
      said series circuit being energized by said voltage source;
   an emergency condition indicator; and
   a second switch controlling said indicator;
   said shunting switch and said second switch being controlled by said voltage sensitive device;
   said voltage sensitive device being responsive to the impedance of said circuit, including said sensor and said resistor, to operate cyclically with a predetermined period, said voltage sensitive device being energized when said resistor is shunted and when said sensor has a low value of impedance, and being de-energized when it is in series with said resistor, the integrity of said circuit being continuously checked by said cyclic operation;
   whereupon failure of a component in said circuit and sensing of the predetermined condition to be detected both operate to cause the predetermined period of said cyclic operation to be modified, thereby activating said indicator through said second switch.

3. A fail-safe self-checking condition monitoring system, comprising:
   a source of alternating electrical power;
   a bi-directionally conductive condition sensor having variable internal impedance;
   voltage sensitive switching means having first and second switch positions; and
   indicating means;
   said condition sensor and said switching means being connected in series across said alternating power source;
   said voltage sensitive switching means being adapted to respond to a first amplitude level of alternating electrical power from said source to pulsate between said first and said second switch positions synchronously with the alternations of said electrical power;
   said voltage sensitive switching means being adapted to respond to a second amplitude level of alternating electrical power from said source greater than said first power level to remain in said first switch position;
   said voltage sensitive switching means being further adapted to respond to a third amplitude level of alternating electrical power from said source less than said first power level to remain in said second switch position;
   said indicating means being actuated by operation of said voltage sensitive switching means during pulsation between said first and second switch positions to indicate normal operation of said condition monitoring system;
   said indicating means being actuated to indicate abnormal operation of said condition monitoring system by operation of said voltage sensitive switching means to remain in either of said first and second switch positions;
   the application of alternating electrical power to said voltage sensitive switching means of said first, second and third levels being determined by said impedance of said condition sensor.

4. The condition monitoring system as recited in claim 3, wherein:
said condition sensor is a photosensor whose impedance varies as a function of illumination; and
said voltage sensitive switching means is an alternating current relay having at least a single pole operative between first and second contacts, said pole being in engagement with said first contact in said first switch position and in engagement with said second contact in said second switch position.

References Cited

UNITED STATES PATENTS

| | | | |
|---|---|---|---|
| 1,552,144 | 9/1925 | Grondahl | 340—228 XR |
| 1,736,993 | 11/1929 | Breisky | 340—228 XR |
| 2,978,591 | 4/1961 | Ringger | 317—124 XR |
| 3,240,960 | 3/1966 | Woodward | 250—206 XR |
| 2,482,820 | 9/1949 | Wolfson et al. | 317—41 X |
| 2,798,213 | 7/1957 | Rowell | 340—409 |
| 2,838,719 | 6/1958 | Chitty | 307—88.5 |
| 3,176,196 | 3/1965 | Dunigan | 317—124 XR |

FOREIGN PATENTS 121,164   3/1946   Australia.

JOHN W. CALDWELL, *Primary Examiner.*

NEIL C. READ, THOMAS B. HABECKER,
*Examiners.*

D. MYER, *Assistant Examiner.*